No. 766,744. PATENTED AUG. 2, 1904.
M. J. TODD.
VEHICLE BRAKE.
APPLICATION FILED OCT. 10, 1903.
NO MODEL. 2 SHEETS—SHEET 2.

Witnesses
Francis S. Magnus

Inventor
M. J. Todd
By
Attorney

No. 766,744. Patented August 2, 1904.

UNITED STATES PATENT OFFICE.

MARQUIS J. TODD, OF BUFFALO, NEW YORK, ASSIGNOR TO BUFFALO PITTS COMPANY, OF BUFFALO, NEW YORK, A CORPORATION OF NEW YORK.

VEHICLE-BRAKE.

SPECIFICATION forming part of Letters Patent No. 766,744, dated August 2, 1904.

Application filed October 10, 1903. Serial No. 176,571. (No model.)

*To all whom it may concern:*

Be it known that I, MARQUIS J. TODD, of Buffalo, in the county of Erie and State of New York, have invented certain new and useful Improvements in Vehicle-Brakes; and I do hereby declare the following to be a full, clear, and exact description of the invention, such as will enable others skilled in the art to which it appertains to make and use the same.

This invention relates to that class of vehicle brake mechanisms having brake-shoes designed to move in unison and concentrically with the pivoted axle, whereby the parallelism of their plane to that of the axle may be maintained and the brake-shoes applied equally independently of the angle of the axle with relation to the vehicle-body, as when turning the vehicle around a curve.

The primary object of the invention is to provide improved means for supporting the brake-shoes vertically and maintaining them laterally within the planes of the wheels, such means being especially designed for use on wagons adapted to heavy transportation, as where the vehicles are drawn by traction-engines.

Figure 1:
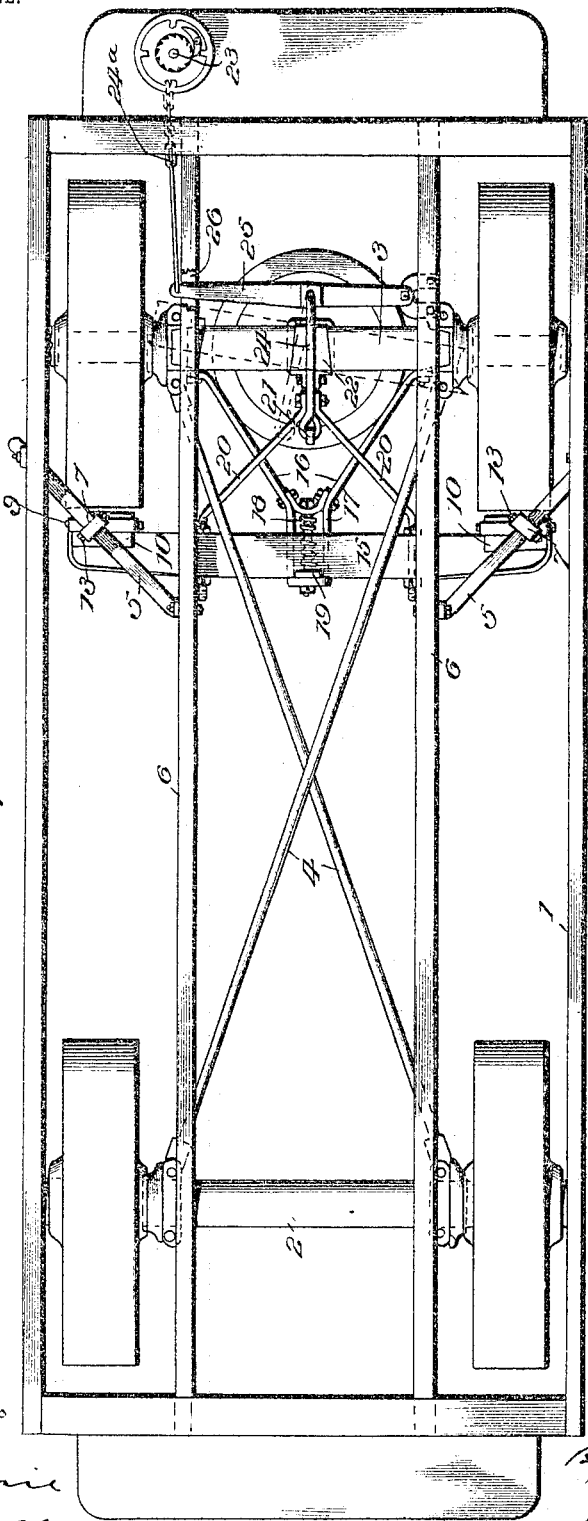
Figure 2:
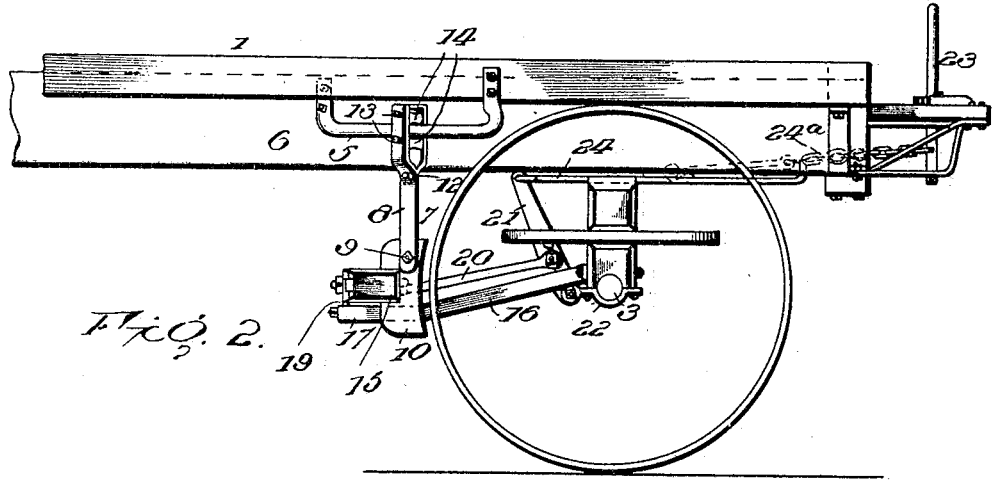
Figure 3:
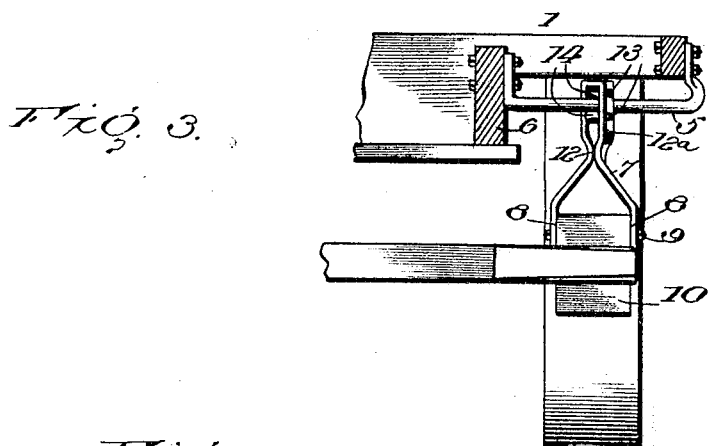
Figure 4:
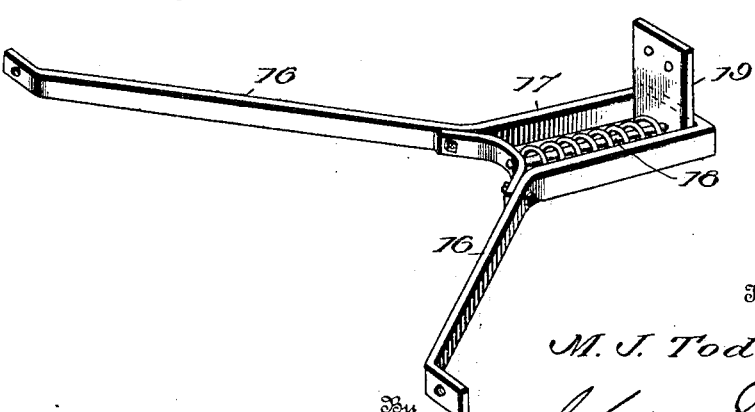

In the accompanying drawings, Figure 1 is a top plan view of a vehicle-bed equipped with my improvement. Fig. 2 is a side elevation, parts being broken away. Fig. 3 shows the brake-shoes and their hangers. Figs. 4 and 5 are details.

Referring to the drawings, 1 designates the bed of a wagon, car, or other vehicle. Both the front and rear axles 2 3 are connected by crossed reaches 4, pivotally secured at their extremities to provide for the two axles moving equally in opposite directions when turning. In the construction of vehicle illustrated the bed is mounted sufficiently high upon the axles to permit of its being extended laterally over the wheels and is equipped with the brake mechanism at its rear end to act in relation to axle 3, although in practice both the front and rear wheels are provided with like mechanism. At either side the bed is provided with a rigid brake-support 5. These are shown as consisting of bars having their ends secured, respectively, to the outer sides of the bed and to the longitudinal beams 6 thereof, the bars intermediate their ends being vertically spaced from the bed and extending at their outer ends well into the planes the wheels may occupy when turning. These bars are horizontally disposed in convergency, each bar constituting approximately the chord of an arc of the circle described by the brake-shoes when moving in unison with the axle.

7 designates the brake-hangers suspended from supports 5. They are shown as strap-irons having parallel portions 8, connected at their free ends by a bolt 9, on which the brake-shoe 10 is mounted, the shoe being sandwiched between the portions 8. The straps above the latter are bent inwardly to form a crotch 12 and loop $12^a$, wherein are upper and lower spindles 13, carrying concaved rollers 14. Each of the supports 5 is designed to be accommodated between the rollers of a hanger to provide tracks on which the latter may move freely. By this trolley construction the hangers of the respective brake-shoes are vertically secured to a stationary part of the vehicle—in this instance the vehicle-bed—and are free to move in planes which will insure the shoes engaging the wheels at any angle the latter may assume in turning. To aid this result, the hanger is partially twisted in its manufacture, so that the plane of the loop $12^a$ is at an angle to that of the portions 8, as shown in Fig. 3. The formation of the rollers 14 further permits the hanger to swing laterally without friction.

15 designates a brake-beam fastened to the shoes and designed to maintain them in proper lateral position—that is, sufficiently spaced apart to correspond with the wagon-tread—and to effect their application and release. Thus the office of the brake-beam is independent of the means of vertical support, which latter serves the additional purpose of guiding the hangers to maintain the shoes in alinement with the wheels. While I have illustrated a brake-beam, yet it is obvious that the office of that element not being the well-known one of carrying the shoes—that is, constituting their support as well as a medium in their application and release—any other construction performing the latter function and maintaining the shoes properly spaced apart may be employed.

Any preferred means may be adopted for connecting the brake-beam to the axle to maintain the two in parallelism and to effect the application of the brakes. I have shown bars 16, connecting the axle to the beam, such bars being secured to the axle and converging therefrom to form a crotch 17, having a bolt 18 passed centrally therethrough, encircled by a coil-spring, a clip 19, secured to the beam, being designed to be engaged by the bolt and spring, whereby the beam is normally held to maintain the shoes released, their application being against the tension of such spring. The mechanism for applying the brakes I have shown as comprising draw-bars 20, secured to the beam and leading therefrom to an upright lever 21, fulcrumed on a clip-plate 22, secured to the axle adjacent its pivot or king bolt. This lever is connected to the brake-shaft 23 through a link 24, a horizontally-disposed lever 25, fulcrumed at one end to one of the beams 6, and a chain 24ª. The free end of lever 25 is supported in a guide 26, formed by a groove or cut-out preferably in the adjacent beam 6. This operating means may be varied to conform to the construction of vehicle to which it is applied. The only essential is to insure the shoes being maintained in parallelism with the axle and effect their movement toward and away from the latter. The lever 25 being mounted on a stationary part of the bed does not move concentrically with the axle, although the upright lever does, the connection between the two levers permitting of this independent action of the upright lever.

In practice the turning of the vehicle in a curve, and consequent swinging of the axle upon its king-bolt, will, through the medium of bars 16 and the brake-beam, move the brake-shoes in a circle concentric with that of the axle, moving the hangers 7 along their supports and maintaining them adjacent the wheels and ready for application by the operating devices acting on draw-bars 20 to throw the beam forward. The disposition of the supports and the construction of the hangers are such as to insure the shoes being accommodated to the extent of curve which the wheels will describe, while the hangers being secured to the stationary bed provides for the positive action of the shoes without vibration or injuring the brake-beam or running-gear. Furthermore, there is no vertical strain upon the beam. The members 5 are the only means of vertical support, while the hangers and their rollers maintain the efficiency of the brake action regardless of the direction in which the wheels are rotating. Then, too, by reason of the swinging connection between the two brake-levers any pull on the horizontal lever is communicated equally to both brake-shoes, and the strain is always from one central point, regardless upon what tangent of a circle the center of the brake-beam may be. Practice has demonstrated the efficiency of the described mechanism when applied to laden freight-cars in use on heavy grades. It is obvious that the invention, while primarily designed for use on the style of car illustrated, is not restricted to such use. When applied to vehicles the width of whose beds terminates within the wheels, it is only necessary to extend the supports 5 outwardly sufficiently to allow the brake-shoes to be disposed in the planes of the wheels.

I claim as my invention—

1. In a vehicle having a swinging axle, brake-shoes, means for movably supporting such shoes secured to a stationary part of such vehicle, means for moving such shoes concentrically with the axle, and means for effecting their application and release.

2. In a vehicle having a swinging axle, supports secured to the stationary bed of such vehicle, brake-shoes suspended from such supports and free to move thereon, means for moving such shoes concentrically with the axle, and means for effecting their application and release.

3. In a vehicle having a stationary bed and a swinging axle, rigid supports secured to such bed, such supports having horizontal convergent portions disposed to constitute approximately chords of arcs of a circle concentric with that of the swinging axle, hangers movably suspended from such supports, brake-shoes carried by such hangers, means for moving the hangers on their supports to maintain the shoes in a plane parallel to the axle, and means for applying and releasing the shoes.

4. In a vehicle having a stationary bed and a swinging axle, rigid supports secured to such bed, such supports having horizontal convergent portions disposed to constitute approximately chords of arcs of a circle concentric with that of the swinging axle, hangers movably suspended from such supports having rollers between which such horizontal portions are designed to be accommodated, brake-shoes carried by such hangers, means for moving the hangers on their supports to maintain the shoes in a plane parallel to the axle, and means for applying and releasing the shoes.

5. In a brake mechanism, the combination with a vehicle having a swinging axle, brake-shoes, supports therefor secured to such vehicle, means for moving such shoes concentrically with the axle, and means for applying and releasing such shoes, of hangers carrying such shoes and mounted on such supports, such hangers having superposed rollers between which such supports are designed to be accommodated.

6. In a brake mechanism, the combination with a vehicle having a swinging axle, brake-shoes, supports therefor secured to such vehicle, means for moving such shoes concentrically with the axle, and means for applying and releasing such shoes, of hangers carrying such shoes and mounted on such supports, such hangers having each parallel portions between which its shoe is mounted, transverse spindles mounted in the other end of such hangers, and concaved rollers on said spindles between which such supports are designed to be accommodated.

7. In a brake mechanism, the combination with a vehicle having a swinging axle, brake-shoes, stationary supports therefor on such vehicle, and means for movably mounting such shoes on such supports, of a beam secured to such shoes, means for maintaining such beam in parallelism to the axle, and means secured to such beam for applying and releasing such brake-shoes.

8. In a brake mechanism, the combination with a vehicle having a swinging axle, brake-shoes, supports therefor on such vehicle, and means for movably mounting such shoes on such supports, of a beam secured to such shoes, convergent bars secured to the axle and forming a crotch, a spring in said crotch, a clip on said beam engaging said spring, and means secured to such beam for applying and releasing such brake-shoes.

9. In a brake mechanism, the combination with a vehicle having a swinging axle, brake-shoes, stationary supports therefor on such vehicle, and means for movably mounting such shoes on such supports, of a beam secured to such shoes, means for maintaining such beam in parallelism to the axle, an upright lever fulcrumed on said axle and connected to said beam, a brake-shaft, and connections between said shaft and said lever.

10. In a brake mechanism, the combination with a vehicle having longitudinal beams, a swinging axle, brake-shoes, supports for the latter on such vehicle, and means for movably mounting such shoes on such supports, of a beam secured to such shoes, convergent bars secured to the axle and forming a crotch, a spring in said crotch, a clip on said beam engaging said spring, and means secured to such beam for applying and releasing such brake-shoes, such means comprising an upright lever fulcrumed on said axle and connected to said brake-beam, a horizontally-disposed lever fulcrumed on one of said beams, a link connecting such levers, a guide in which the free end of such horizontally-disposed lever is designed to move, a brake-shaft, and a connection between said brake-shaft and said latter lever.

11. The combination with a wheeled vehicle having a swinging axle, stationary supports on such vehicle and brake-shoes movable on such supports, of means for effecting the application and release of the shoes, comprising a brake-beam secured to the shoes, an upright lever movable concentrically with said axle and connected to said beam, a second lever mounted on a stationary part of the vehicle-bed, a connection between said levers, and operative means connected to said second lever, as set forth.

12. The combination with a wheeled vehicle having a swinging axle, stationary supports on such vehicle and brake-shoes movable on such supports, of means for effecting the application and release of the shoes, comprising a brake-beam secured to the shoes, an upright lever movable concentrically with said axle and connected to said beam, a second lever mounted on a stationary part of the vehicle-bed, a link pivoted at one end to the second lever and at its other end to the upper end of the upright lever, and operative means connected to said second lever, as set forth.

In testimony whereof I have signed this specification in the presence of two subscribing witnesses.

MARQUIS J. TODD.

Witnesses:
GRAFTON L. McGILL,
FRANCIS S. MAGUIRE.